US011299033B2

(12) United States Patent
Ikeda et al.

(10) Patent No.: US 11,299,033 B2
(45) Date of Patent: Apr. 12, 2022

(54) WORK MACHINE

(71) Applicant: Komatsu Ltd., Tokyo (JP)

(72) Inventors: Masahiro Ikeda, Tokyo (JP); Kazuya Imamura, Tokyo (JP)

(73) Assignee: Komatsu Ltd., Tokyo (JP)

( * ) Notice: Subject to any disclaimer, the term of this patent is extended or adjusted under 35 U.S.C. 154(b) by 36 days.

(21) Appl. No.: 16/651,406

(22) PCT Filed: Feb. 27, 2019

(86) PCT No.: PCT/JP2019/007543
§ 371 (c)(1),
(2) Date: Mar. 27, 2020

(87) PCT Pub. No.: WO2019/168024
PCT Pub. Date: Sep. 6, 2019

(65) Prior Publication Data
US 2020/0282823 A1  Sep. 10, 2020

(30) Foreign Application Priority Data
Feb. 28, 2018 (JP) .............................. JP2018-035512

(51) Int. Cl.
*B60K 11/00* (2006.01)
*B60K 11/06* (2006.01)
*B60K 11/08* (2006.01)
*B60K 11/02* (2006.01)

(52) U.S. Cl.
CPC .............. *B60K 11/06* (2013.01); *B60K 11/08* (2013.01); *B60K 11/02* (2013.01)

(58) Field of Classification Search
CPC ........... B60K 11/02; B60K 11/06; B60K 11/08
See application file for complete search history.

(56) References Cited

U.S. PATENT DOCUMENTS 5,816,350 A * 10/1998 Akira .................... E02F 9/0891
180/68.1
8,684,116 B2 * 4/2014 Nakashima .............. F01P 11/12
180/68.1
9,080,307 B2 * 7/2015 Numa .................... E02F 9/0891
(Continued)

FOREIGN PATENT DOCUMENTS

CN         104179558 A    12/2014
DE    102008022887 A1    11/2009
(Continued)

*Primary Examiner* — Hau V Phan
(74) *Attorney, Agent, or Firm* — Locke Lord LLP

(57) ABSTRACT

A work machine includes a first cooling unit that protrudes from a first wall surface at a first position of a main flow path and defines a first opening portion between the second wall surface and the first cooling unit; a second cooling unit that protrudes from the second wall surface on a downstream side of the first position in the flow path direction of the main flow path, defines a second opening portion between the first wall surface and the second cooling unit and partly overlaps with the first cooling unit when viewed from the flow path direction; and partition member that defines a first section flow path having the first cooling unit as an inlet and the second opening portion as an outlet and a second section flow path having the first opening portion as an inlet and the second cooling unit as an outlet.

16 Claims, 6 Drawing Sheets

(56) References Cited

U.S. PATENT DOCUMENTS

| | | | | |
|---|---|---|---|---|
| 9,733,022 B2* | 8/2017 | Wilkins | ............... | F28D 1/0435 |
| 2002/0104491 A1* | 8/2002 | Izumi | ................... | E02F 9/0866 |
| | | | | 123/41.49 |
| 2004/0173395 A1* | 9/2004 | Arai | ....................... | F01P 11/10 |
| | | | | 180/68.1 |
| 2006/0090883 A1* | 5/2006 | Huang | .................. | F28D 15/00 |
| | | | | 165/104.26 |
| 2006/0169507 A1* | 8/2006 | Inoue | .............. | H01M 10/6563 |
| | | | | 180/68.4 |
| 2007/0051490 A1* | 3/2007 | Walter | .................... | B60K 1/00 |
| | | | | 165/42 |
| 2016/0031311 A1* | 2/2016 | Inaoka | ..................... | F01P 3/20 |
| | | | | 180/68.4 |
| 2017/0362796 A1* | 12/2017 | Nakagawa | ........... | E02F 9/2075 |

FOREIGN PATENT DOCUMENTS

| | | |
|---|---|---|
| JP | 60-015917 U | 2/1985 |
| JP | 2006-017050 A | 1/2006 |
| JP | 2017-002582 A | 1/2017 |

* cited by examiner

WORK MACHINE

TECHNICAL FIELD

The present invention relates to a work machine.

The application claims priority to Japanese Patent Application No. 2018-035512, filed on Feb. 28, 2018 to Japan, the contents of which are incorporated herein by reference.

BACKGROUND TECHNOLOGY

Patent Document 1 discloses a work machine equipped with a cooling device. The cooling device is provided in a cover of the work machine. The cooling device includes a fan, and a radiator, an oil cooler, and an inter-cooler serving as cooling units for receiving air by the fan. These cooling units are obliquely arranged in parallel so that end portion of each of the cooling units overlaps each other when viewed from an opening formed in the cover.

PRIOR ART DOCUMENT

Patent Document

[Patent Document 1] Japanese Unexamined Patent Application Publication No. 2006-17050.

SUMMARY OF THE INVENTION

Problems to be Solved by the Invention

In order to improve cooling performance by the cooling units, it is necessary to secure a cooling area, which is an area to receive air, while suppressing ventilation resistance and securing a flow rate of air. On the other hand, if a plurality of cooling units are inadvertently arranged, the installation space increases thereby resulting in an increase in the size of the work machine itself.

The present invention is provided in view of such a problem and the object thereof is to provide a work machine capable of improving cooling performance while achieving compactness.

Means for Solving the Problem

An aspect of the present invention provides a work machine including: a work machine main body in which a main flow path extending in one direction by a first wall surface and a second wall surface opposed to each other is defined; a fan for allowing air to flow along a flow path direction which is a direction in which the main flow path extends; a first cooling unit that protrudes from the first wall surface so as to be perpendicular to the flow path direction and defines a first opening portion between the first cooling unit and the second wall surface, at a first position in the flow path direction of the main flow path; a second cooling unit that protrudes from the second wall surface so as to be perpendicular to the flow path direction and defines a second opening portion between the first wall surface and the second cooling unit along with partially overlapping the first cooling unit when viewed from the flow path direction, at a second position downstream of the first position in the flow path direction of the main flow path; and a partition member that is provided across an end portion of the first cooling unit on the second wall surface side and an end portion of the second cooling unit on the first wall surface side, and defines a first section flow path having the first cooling unit as an inlet and the second opening portion as an outlet, and a second section flow path having the first opening portion as an inlet and the second cooling unit as an outlet.

Effect of Invention

According to the work machine of the present invention, cooling performance can be improved while reducing in size is achieved.

MODE FOR CARRYING OUT THE INVENTION

First Embodiment

An embodiment of the present invention will be described in detail below with reference to FIG. 1 to FIG. 5.

<Work Machine>

Figure 1:
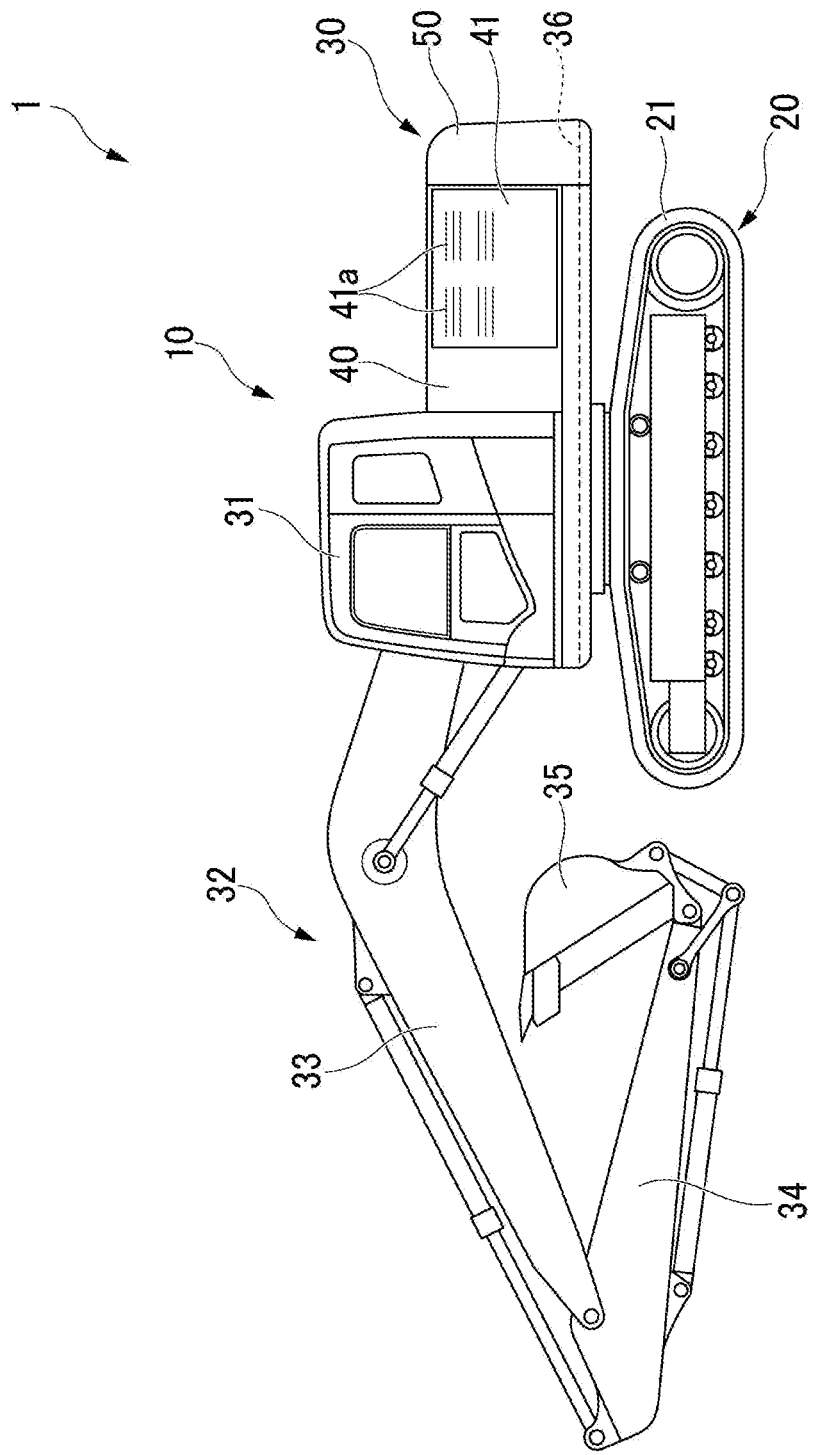
FIG. 1 is a side view of a hydraulic excavator according to a first embodiment of the present invention.

As shown in FIG. 1, a hydraulic excavator 1 as a work machine includes an undercarriage 20 and a work machine main body 10 having an upper swing body 30. In the following description, a direction in which gravity is applied in a state in which the hydraulic excavator 1 is placed in the horizontal surface is referred to as "vertical direction". Further, a front of an operator's seat in the cab 31 which will be described later is simply referred to as "forward", and a rear thereof is simply referred to as "rearward". In addition, left and right directions of the upper swing body 30 viewed from the operator's seat are simply referred to as "right-left directions", and the left side and the right side thereof are respectively referred to as "left side" and "right side".

<Undercarriage>

The undercarriage 20 includes a pair of left and right crawler tracks 21, and make the hydraulic excavator 1 to travel by driving the crawler tracks 21 by a traveling hydraulic motor (not shown).

<Upper Swing Body>

The upper swing body 30 is disposed on the undercarriage 20 so as to be capable of swinging. The upper swing body 30 includes the cab 31, a work equipment 32, an exterior cover 40, a door cover 41, and a counterweight 50, which are provided on a frame (not shown). An undercover 36 is provided on a lower surface of the frame.

The cab 31 is disposed on the left side (one side in the right-left directions) of a front portion of the upper swing body 30, and is provided with the operator's seat.

The work equipment 32 is provided so as to extend forward of the upper swing body 30, and has a boom 33, an arm 34, and a bucket 35. The work equipment 32 performs various operations such as excavation by driving the boom 33, the arm 34, and the bucket 35 by respective hydraulic cylinders (not shown).

The undercover 36 is provided on the lower surface of the frame so as to close an opening portion of the frame.

The exterior cover 40 is provided on the undercover 36. A machine room on an undercover 36 is defined in an inside of the exterior cover 40. The exterior cover 40 has an outer shape of an upper swing body 30. Both sides in the right-left directions of the exterior cover 40 are opened to the outside. The door cover 41 is provided on the opening on both sides in the right-left directions of the exterior cover 40 so as to be capable of being open and close. The door cover 41 is provided with a vent hole 41a for communicating between the machine room and the outside.

Figure 2:
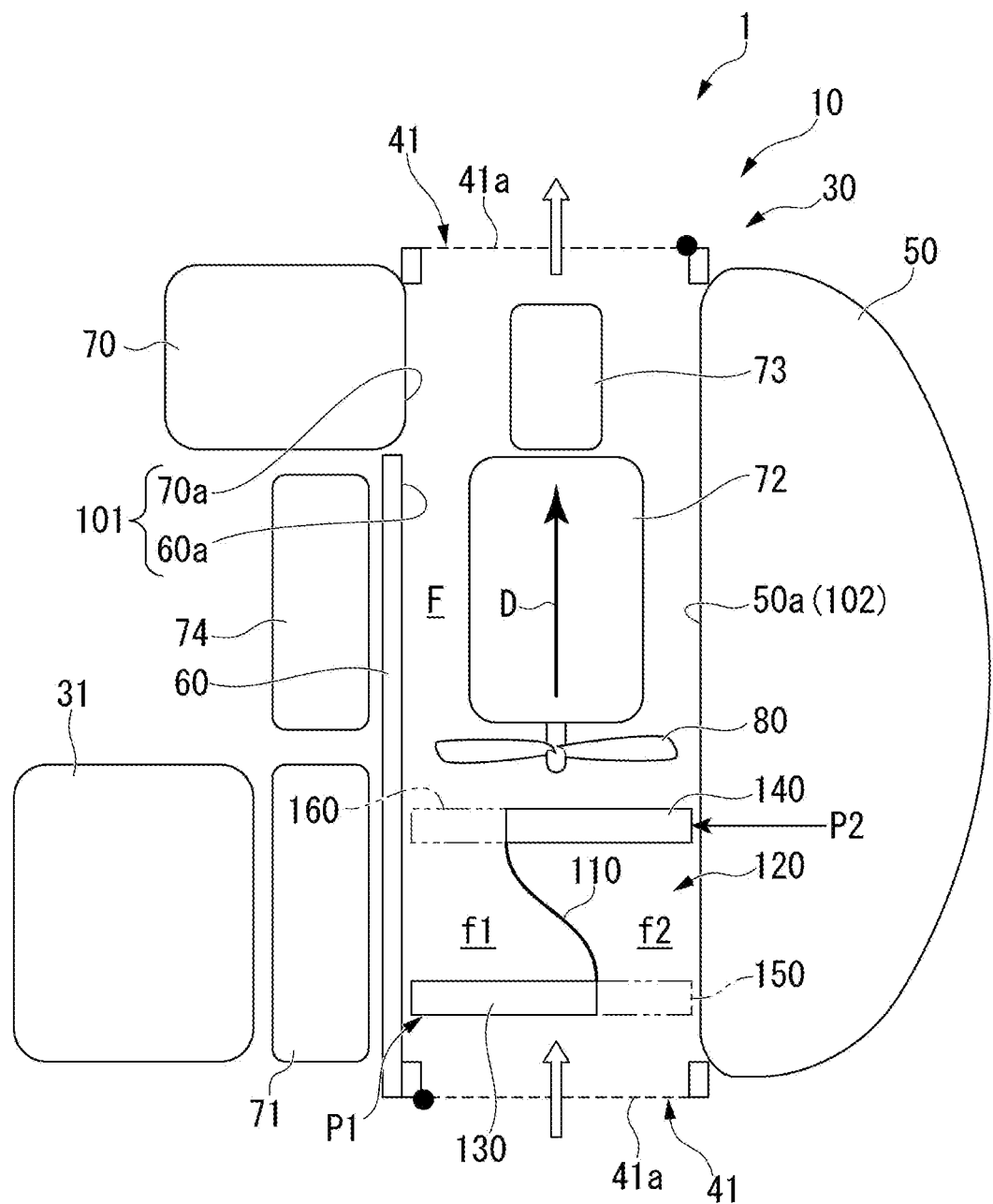
FIG. 2 is a schematic plan view showing the internal structure of the present invention in the hydraulic excavator according to the first embodiment of the upper swing body.

As shown in FIG. 2, the counterweight 50 is provided inside the upper swing body 30, on a rear portion of the upper swing body 30, and across the upper swing body in the right-left directions. A front surface facing forward in the counterweight 50 extends across the upper swing body 30 in the right-left directions.

A partition plate 60, an oil tank 70, a device housing 71, an engine 72, a hydraulic pump 73, a hydraulic valve 74, a fan 80, and a cooling device 120 are provided in a machine room inside the exterior cover 40 of the upper swing body 30.

The partition plate 60 is provided on the forward side of the counterweight 50 so as to be spaced apart from each other. The partition plate 60 has a plate shape extending along a vertical surface and extends in the right-left directions of the upper swing body 30. More specifically, the partition plate 60 extends from an end portion on the left side of the upper swing body 30 to right side thereof.

Oil supplied to the hydraulic devices is stored in the oil tank 70. The oil tank 70 is provided on the forward side of the counterweight 50 in the upper swing body 30 and on an end portion of the right side of the upper swing body 30. On the left side of the oil tank 70, the partition plate 60 extends so as to be continuous with the oil tank 70. Each of rear surfaces of the partition plate 60 and the oil tank 70 extend in a width direction of the upper swing body 30 so as to be continuous with each other.

<Main Flow Path>

Figure 3:
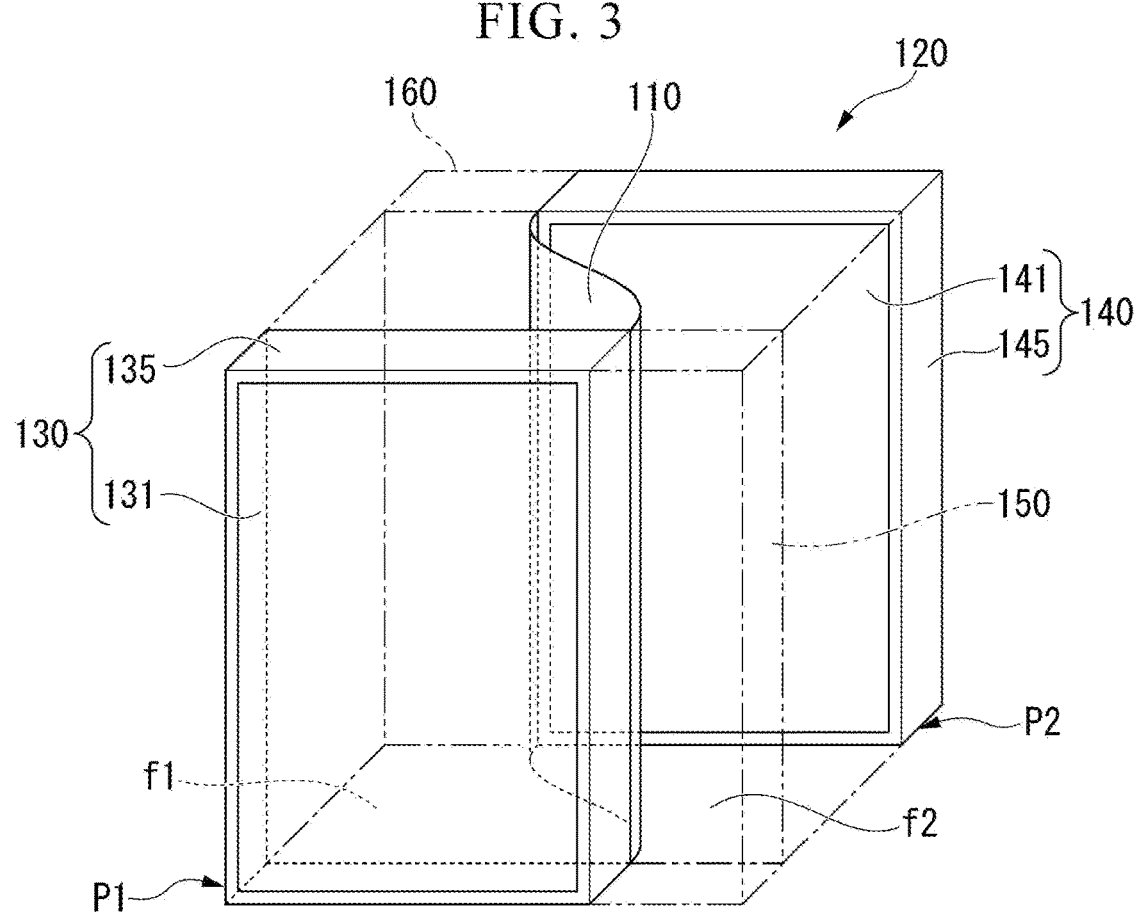
FIG. 3 is a perspective view of a cooling device in a hydraulic excavator according to the first embodiment of the present invention.
Figure 4:
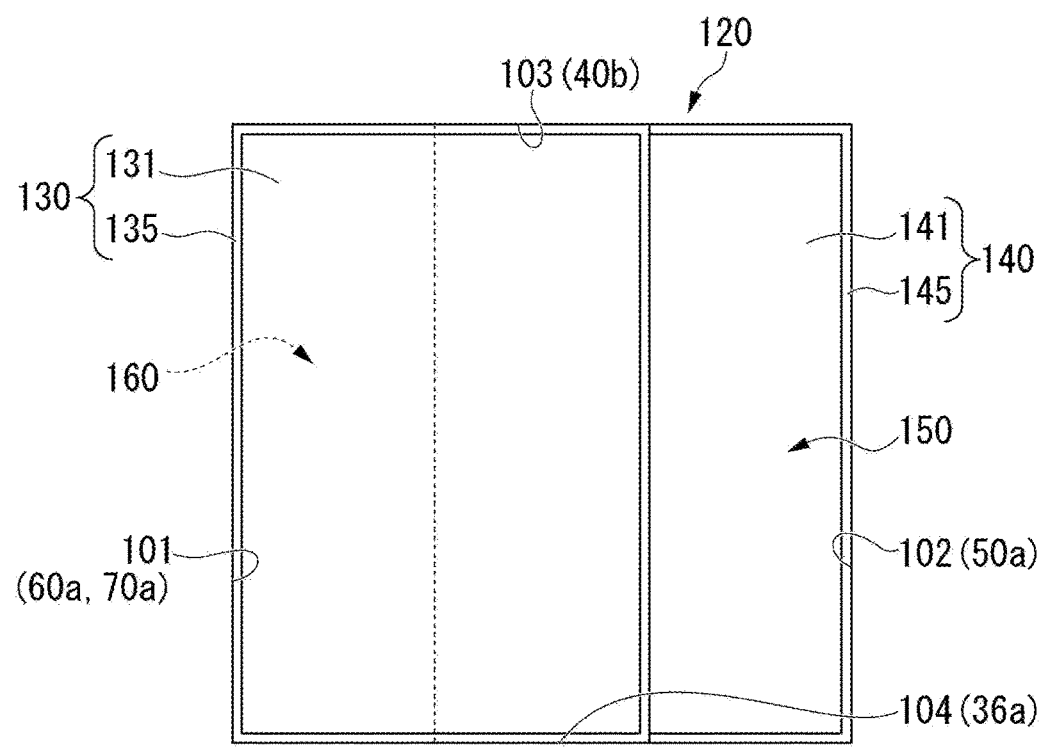
FIG. 4 is a view of the cooling device of FIG. 2 as viewed from the upstream side in a flow path direction.

Here, as shown in FIG. 2 to FIG. 4, a main flow path F extending across the right-left directions of the upper swing body 30 is formed in the upper swing body 30. As shown in FIG. 4, the main flow path F is defined by each of the rear surfaces 60a and 70a of the partition plate 60 and the oil tank 70, a front surface 50a of the counterweight 50, a top surface 40b of the exterior cover 40, and an upper surface 36a of the undercover 36.

As shown in FIG. 4, each of the rear surfaces 60a and 70a of the partition plate 60 and the oil tank 70 and the front surface 50a of the counterweight 50 face each other in the forward-rearward directions and extend along the vertical surface. The top surface 40b of the exterior cover 40 and the upper surface 36a of the undercover 36 face each other in the vertical direction and extend in the horizontal direction.

Therefore, a flow path cross-sectional shape of the main flow path F has a quadrangular shape when viewed from a flow path direction D which is a direction in which the main flow path F extends.

The rear surfaces 60a and 70a of the partition plate 60 and the oil tank 70 are defined as a first wall surface 101 of a wall portion partitioning and forming the main flow path F. The front surface 50a of the counterweight 50 is defined as a second wall surface 102 of the wall portion. The top surface 40b of the exterior cover 40 is defined as an upper wall surface 103 of the wall portion. The upper surface 36a of the undercover 36 is defined as a lower wall surface 104 of the wall portion. That is, the main flow path F is defined by the wall portion having the first wall surface 101, the second wall surface 102, the upper wall surface 103, and the lower wall surface 104.

The door covers 41 are respectively located on both ends in the flow path direction D of the main flow path F. The main flow path F communicates with the outside of the upper swing body 30 through the ventilation hole 41a formed in the door cover 41.

The device housing 71 is a portion on the left side in the width direction in the upper swing body 30 and is provided between the partition plate 60 and the cab 31. Various devices are housed in the device housing 71.

The engine 72 is provided in the main flow path F. The engine 72 is provided in a state in which a rotation shaft is aligned with the flow path direction D (the right-left directions of the upper swing body 30). The right side of the engine 72 is provided with a hydraulic pump 73. The hydraulic pump 73 is driven in accordance with a rotation of the engine 72 to generate a pressurized oil from the oil stored in the oil tank 70.

The hydraulic valve 74 is provided on the forward side of the partition plate 60 and between the device housing 71 and the oil tank 70. The hydraulic valve 74 distributes the hydraulic pressure generated by the hydraulic pump 73 to each hydraulic device.

<Fan>

The fan 80 is integrally provided on the left side of the upper swing body 30 in the engine 72. The fan 80 rotates in accordance with the rotation of the engine 72, thereby blowing air into the main flow path F. In the present embodiment, the fan 80 blows air into the main flow path F from the left side of the upper swing body 30 toward the right side thereof. Therefore, in the flow path direction D, the left side of the upper swing body 30 is an upstream side, and the right side thereof is a downstream side.

<Cooling Device>

Next, the cooling device 120 will be described. As shown in FIG. 2, the cooling device 120 is provided on the upstream side in the flow path direction D of the engine 72 and the fan 80 in the main flow path F. The cooling device 120 includes a first cooling unit 130, a second cooling unit 140, and a partition member 110.

<Configuration of First Cooling Unit and Second Cooling Unit>

As shown in FIG. 2 to FIG. 4, the first cooling unit 130 and the second cooling unit 140 have a rectangular parallelepiped shape having a quadrangular shape as viewed from the flow path direction D. The four sides of the quadrangular shape coincide with the forward-rearward directions and vertical direction of the upper swing body 30. The first cooling unit 130 and the second cooling unit 140 are arranged in the main flow path F in such a state that a front surface having a quadrangular shape faces the upstream side in the flow path direction D and a back surface having a quadrangular shape similarly to the front surface faces the downstream side in the flow path direction D.

In the following description, the right-left directions when the first cooling unit 130 and the second cooling unit 140 are viewed from the front side or the back side are referred to as the width direction of the first cooling unit 130 or the second cooling unit 140. The vertical direction of the first cooling unit 130 and the second cooling unit 140 is referred to as a height direction of the first cooling unit 130 or the second cooling unit 140. In addition, the flow path direction D of the first cooling unit 130 and the second cooling unit 140 will be referred to as a thickness direction of the first cooling unit 130 and the second cooling unit 140. The first cooling unit 130 and the second cooling unit 140 have a rectangular parallelepiped shape extending in the width direction, the height direction, and the thickness direction. The width direction, the height direction, and the thickness direction are orthogonal to each other. The size in the thickness direction of the first cooling unit 130 and the second cooling unit 140 is smaller than the size in the height direction and the width direction.

As shown in FIG. 3, the first cooling unit 130 and the second cooling unit 140 include cores 131 and 141 as a heat exchanger which constitutes at least one of cooling equipment such as a radiator, an oil cooler and an aftercooler, and an outer frames 135 and 145 for housing the cores 131 and 141.

The radiator has a role of cooling the heated cooling water by cooling the engine 72. The oil cooler has a role of cooling an operating oil flowing through the hydraulic circuit. The aftercooler has a role of cooling a supercharging air before being compressed and introduced into the engine 72 in order to improve the intake air efficiency of the engine 72 and improve the performance of the engine 72.

Figure 5:
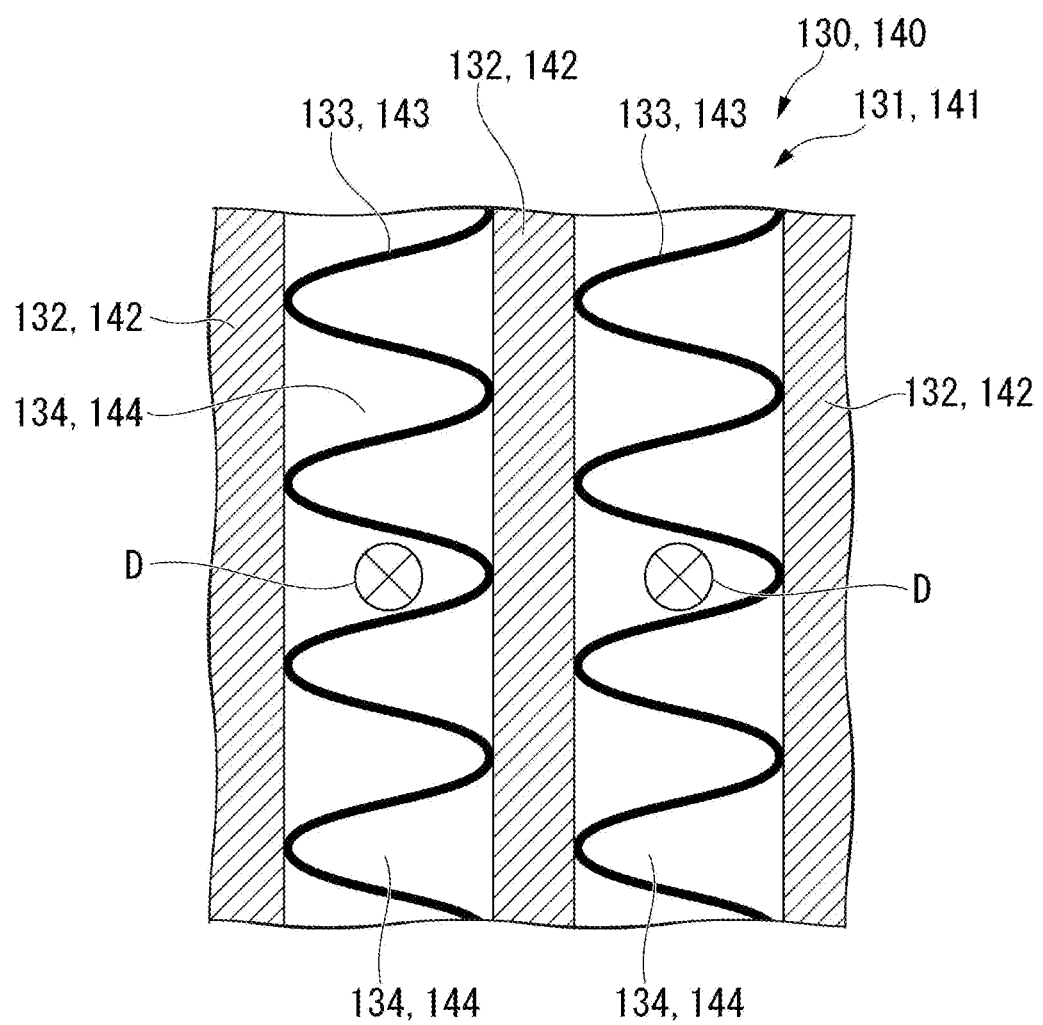
FIG. 5 is an enlarged view of the heat radiation portions of a first cooling unit and a second cooling unit as seen from the upstream side in the flow path direction.

As shown in FIG. 5, the cores 131 and 141 in the first cooling unit 130 and the second cooling unit 140 includes heat radiation tubes 132 and 142 and fins 133 and 143. A plurality of the heat radiation tubes 132 and 142 extend in the height direction of the first cooling unit 130 and the second cooling unit 140 and are spaced apart from each other in the width direction. The plurality of the heat radiation tubes 132 and 142 may be arranged in the thickness direction in the same width direction position.

The fins 133 and 143 are provided between the heat radiation tubes 132 and 142 adjacent to each other in the width direction. The fins 133 and 143 are formed in a so-called corrugate shape in which the fins are alternately brought into contact with a pair of heat radiation tubes 132 and 142 that are adjacent to each other while directed upward. By the fins 133 and 143 and the heat radiation tubes 132 and 142, a plurality of communication holes 134 and 144 extending in a direction coinciding with the flow path direction D over the front surface and the back surface of the first cooling unit 130 are provided in the cooling equipment.

The outer frames 135 and 145 are formed in a frame shape surrounding end surfaces on both sides in the height direction of the cooling equipment and end surfaces on both sides in the width direction of the cooling equipment. The front surface and back surface of each of the outer frames 135 and 145 are opened substantially over the entire surface, and the cores 131 and 141 of the cooling equipment are exposed to the front surface side (the upstream side in the flow path direction D) of the outer frames and the back surface side (the downstream side in the flow path direction D) thereof through the opening of the outer frames.

Here, the area occupied by all the communication holes 134 and 144 with respect to the total area of the first cooling unit 130 and the second cooling unit 140 when the first cooling unit 130 and the second cooling unit 140 are viewed from the front is defined as an opening ratio. In the present embodiment, the opening ratio of the first cooling unit 130 and the second cooling unit 140 is set in a range of 50 to 80%, preferably 60 to 75%. The opening ratio indicates the ratio of the area through which air flows. When the opening ratio is too large, the area occupied by the heat radiation tubes 132 and 142 and the fin 133 and 143 becomes relatively small, so that the heat exchange efficiency is reduced. When the opening ratio is too small, the area occupied by the communication holes 134 and 144 becomes relatively small, so that the ventilation resistance increases.

<Arrangement of First Cooling Unit>

As shown in FIG. 2, the first cooling unit 130 is provided at a position (first position P1) on the upstream side of the main flow path F. The first position P1 is a position between the fan 80 and the door cover 41 on the upstream side in the flow path direction D. Between the door cover 41 and the first position P1, a space for guiding the air introduced from the ventilation hole 41a to the entire cooling device 120 is formed. In the first cooling unit 130, the end portion on one side in the width direction (the left side in FIG. 2 to FIG. 4) is in contact with the first wall surface 101 over the vertical direction of the first wall surface. As shown in FIG. 4, the upper end of the first cooling unit 130 is in contact with the upper wall surface 103 over the width direction of the upper wall surface. The lower end of the first cooling unit 130 is in contact with the lower wall surface 104 over the width direction of the lower wall surface. The first cooling unit 130 extends in a direction perpendicular to the flow path direction D when seen from a plan view. That is, the width direction of the first cooling unit 130 is perpendicular to the flow path direction D. The front surface and back surface of the first cooling unit 130 are perpendicular to the flow path direction D.

The end portion of the other side in the width direction of the first cooling unit 130 (the right side in FIG. 2 to FIG. 4) does not reach the second wall surface 102 and is disposed at a distance from the second wall surface 102. The space between the end portion on the other side in the width direction of the first cooling unit 130 and the second wall surface 102 is defined as a first opening portion 150. That is, the first cooling unit 130 is disposed so as to protrude from the first wall surface 101 so as to be perpendicular to the flow path direction D at the first position P1 of the main flow path F and defines a first opening portion 150 between the second wall surface 102 and the first cooling unit 130.

The first opening portion 150 has a quadrangular shape when viewed from the flow path direction D. In the present embodiment, the area of the first cooling unit 130 when viewed from the flow path direction D is larger than that of the first opening portion 150. The first cooling unit 130 protrudes toward the second wall surface 102 side from the center in the width direction of the main flow path F. That is, in the flow path section of the main flow path F at the first position P1, the occupied area of the first cooling unit 130 is larger than the occupied area of the first opening portion 150.

<Arrangement of Second Cooling Unit>

As shown in FIG. 2, the second cooling unit 140 is provided at a position (second position P2) on the downstream side of the first position P1 in the main flow path F. In the second cooling unit 140, the end portion on the other side in the width direction is in contact with the second wall surface 102 over the vertical direction of the second wall surface. As shown in FIG. 4, the upper end of the second cooling unit 140 is in contact with the upper wall surface 103 over the width direction of the upper wall surface. The lower end of the second cooling unit 140 is in contact with the lower wall surface 104 over the width direction of the lower wall surface. The second cooling unit 140 extends in a direction perpendicular to the flow path direction D when seen from a plan view. That is, the width direction of the second cooling unit 140 is perpendicular to the flow path direction D. The front surface and the back surface of the second cooling unit 140 are perpendicular to the flow path direction D.

The end portion on the one side in the width direction of the second cooling unit 140 does not reach the first wall surface 101 and is disposed at a distance from the first wall surface 101. A space between the end portion on one side in the width direction of the second cooling unit 140 and the first wall surface 101 is defined as a second opening portion 160. That is, the second cooling unit 140 is disposed so as to protrude from the second wall surface 102 so as to be perpendicular to the flow path direction D at the second position P2 of the main flow path F and defines the second opening portion 160 between the first wall surface 101 and the second cooling unit 140.

The second opening portion 160 has a quadrangular shape when viewed from the flow path direction D. In the present embodiment, the area of the second cooling unit 140 when viewed from the flow path direction D is larger than the area of the second opening portion 160. The second cooling unit 140 protrudes toward the first wall surface 101 side from the center in the width direction of the main flow path F. That is, in the flow path section of the main flow path F at the second position P2, the occupied area of the second cooling unit 140 is larger than the occupied area of the second opening portion 160.

When viewed from the flow path direction D, part of the first cooling unit 130 and part of the second cooling unit 140 overlap each other. In the present embodiment, a portion of the first cooling unit 130 on the second wall surface 102 side and a portion of the second cooling unit 140 on the first wall surface 101 side overlap each other over the entire height direction. These overlapping regions have a quadrangular shape when viewed from the flow path direction D.

Here, it is preferable that a size in the width direction of the first cooling unit 130 is set to a value of 60 to 80% of a size in the same direction of the main flow path F. Similarly, a size in the width direction of the second cooling unit 140 is preferably set to 60 to 80% of a size in the same direction of the main flow path F. In the present embodiment, size in the width direction of the first cooling unit 130 and size in the width direction of the second cooling unit 140 are identical to each other.

<Partition Member>

As shown in FIG. 2 and FIG. 3, the partition member 110 is provided across the first cooling unit 130 and the second cooling unit 140. Both ends of the partition member 110 are respectively connected to an end portion (end portion on the first opening portion 150 side) of the second wall surface 102 side in the first cooling unit 130 and an end portion (end portion on the second opening portion 160 side) on the first wall surface 101 side in the second cooling unit 140 over the vertical direction thereof. The partition member 110 extends in a plate shape over the upper wall surface 103 and the lower wall surface 104 over the entire area between the first cooling unit 130 and the second cooling unit 140. As a result, the partition member 110 defines the first section flow path f1 having the first cooling unit 130 as an inlet and the second opening portion 160 as an outlet and the second section flow path f2 having the first opening portion 150 as an inlet and the second cooling unit 140 as an outlet.

When viewed from a plan view shown in FIG. 2, the partition member 110 has a shape extending continuously from the end portion of the first cooling unit 130 on the second wall surface 102 side toward the end portion of the second cooling unit 140 on the first wall surface 101 side toward the downstream side in the flow path direction D.

Accordingly, the first section flow path f1 is connected to the second opening portion 160 after the flow path cross-sectional area (the area of the cross section orthogonal to the flow path direction D) gradually decreases from the outlet of the first cooling unit 130 on the upstream side in the flow path direction D toward the downstream side. The second section flow path f2 is connected to the inlet of the second cooling unit 140 after the flow path cross-sectional area gradually increases from the first opening portion 150 on the upstream side in the flow path direction D toward the downstream side.

The partition member 110 is preferable to have a curved shape. Accordingly, air can be smoothly guided, thereby suppressing the generation of turbulence and the increase in resistance based on the turbulence.

<Operation and Effects>

During operation of the hydraulic excavator 1, the fan 80 is rotated by the driving of the engine 72, and air flows from the upstream side to the downstream side in the main flow path F. As a result, the air passes through the communication holes 134 and 144 passing through the first cooling unit 130 and the second cooling unit 140 in the flow path direction D. At this time, the air flowing through the communication holes 134 and 144 and the medium flowing through the heat radiation tube 132 and 142 perform heat exchange, whereby the medium is cooled. As a result, cooling water, oil, charge air, and the like, are cooled.

In order to improve the cooling performance of the first cooling unit 130 and the second cooling unit 140, it is necessary to secure the cooling area of the first cooling unit 130 and the second cooling unit 140. The cooling area is an area in which the first cooling unit 130 and the second cooling unit 140 receive air, and corresponds to an area of the cores 131 and 141 when the first cooling unit 130 and the second cooling unit 140 are viewed from the flow path direction D.

For example, when the first cooling unit 130 and the second cooling unit 140 are arranged side by side in the height direction, although the cooling area is possible to secure, a size in the vertical direction of the upper swing body 30 is necessary to be large. In this case, there is a disadvantage in that the visibility of the rearward side of the cab 31 is reduced.

Further, for example, when the first cooling unit 130 and the second cooling unit 140 are arranged side by side in the width direction, although the cooling area is possible to secure, a size in the forward-rearward directions of the upper swing body 30 is necessary to be large. In this case, the swing radius of the upper swing body 30 becomes large.

On the other hand, for example, when the first cooling unit 130 and the second cooling unit 140 are arranged in series, the air heated by the first cooling unit 130 is introduced into the second cooling unit 140, thereby inhibiting the cooling effect.

In contrast, in the present embodiment, the first cooling unit 130 and the second cooling unit 140 that are spaced apart from each other in the flow path direction D are arranged so as to be shifted in the forward-rearward directions of the upper swing body 30 so that only part of the first cooling unit 130 and part of the second cooling unit 140 overlap each other when viewed from the flow path direction D. That is, only the portion of the first cooling unit 130 on the second wall surface 102 side and the portion of the second cooling unit 140 on the first wall surface 101 side overlap each other in the flow path direction D. Therefore, the cooling device 120 itself can have a compact configuration.

Further, the air which has flowed into the first cooling unit 130 on the upstream side is discharged to the downstream side of the cooling device 120 through the first section flow path f1. On the other hand, the air entering from the first opening portion 150 without being blocked by the first cooling unit 130 is introduced into the second cooling unit 140 through the second section flow path f2. Accordingly, it is possible to appropriately introduce air into each of the first cooling unit 130 and the second cooling unit 140. In addition, air that is not heated by the first cooling unit 130 can be introduced to the second cooling unit 140 disposed downstream. In this way, it is possible to ensure the cooling effect with both cooling units.

Here, the front surface and the back surface of the first cooling unit 130 and the second cooling unit 140 are perpendicular to each other in the flow path direction D. The communication holes 134 and 144 between the heat radiation tubes 132 and 142 and the fins 133 and 143 of the first cooling unit 130 and the second cooling unit 140 extend in the direction coinciding with the flow path direction D.

When the first cooling unit 130 and the second cooling unit 140 are installed so that the width direction thereof is inclined from a direction perpendicular to the flow path direction D, the communication holes 134 and 144 are also inclined with respect to the flow path direction D. In this case, since the air flows and is curved when passing through the communication holes 134 and 144, the air ventilation resistance is increased. Therefore, it is not possible to secure a sufficient ventilation amount, and the cooling effect is reduced.

In contrast, in the present embodiment, the first cooling unit 130 and the second cooling unit 140 are opposed to each other in the flow path direction D which is the flow direction of air. That is, the postures of the first cooling unit 130 and the second cooling unit 140 are set such that the communication holes 134 and 144 of the first cooling unit 130 and the second cooling unit 140 coincide with each other in the flow path direction D. Therefore, it is possible to prevent the flow of air from being curved when passing through the communication holes 134 and 144. As a result, it is possible to reduce the ventilation resistance, and it is possible to secure cooling effect.

In the present embodiment, the flow path cross-sectional area of the first section flow path f1 decreases toward the outlet from the inlet. In the first cooling unit 130 serving as an inlet of the first section flow path f1, an area corresponding to the opening ratio thereof becomes a flow area of air. That is, the flow area of air is smaller than the area of the entire inlet of the first section flow path f1. Therefore, even when the flow path cross-sectional area of the first section flow path f1 decreases toward the downstream side, the flow path cross-sectional area of the second opening portion 160 serving as the outlet of the first section flow path f1 does not decrease significantly as compared with the flow path cross-sectional area in which air actually flows in the inlet of the first section flow path f1. Therefore, a large ventilation resistance does not occur, and it is possible to utilize efficiently the space.

Similarly, the flow path cross-sectional area of the second section flow path f2 increases toward the outlet from the inlet. In the second cooling unit 140 serving as an outlet of the second section flow path f2, an area corresponding to the opening ratio thereof is a flow area of air. That is, the flow area of air is smaller than the area of the entire second cooling unit 140 served as the outlet of the second section flow path f2. Therefore, even when the flow path cross-sectional area of the second section flow path f2 increases toward the downstream side, the flow path cross-sectional area in which the air actually flows in an outlet of the second section flow path f2 does not become significantly larger than the flow path cross-sectional area in the first opening portion 150 which serves as an inlet of the second section flow path f2. Therefore, the air required to cool the second cooling unit 140 through the first opening portion 150 formed relatively narrow is possible to be introduced into the second cooling unit 140 while efficiently utilizing the space.

For example, when the sizes in the width direction of the first cooling unit 130 and the second cooling unit 140 are 5/8 of the size in the same direction of the main flow path F, the sizes in the width direction of the first opening portion 150 and the second opening portion 160 becomes 3/8 of the size in the same direction of the main flow path F. In this case, when the opening ratio of the first cooling unit 130 and the second cooling unit 140 is 60%, the flow path cross-sectional area of the inlet and the outlet of the first section flow path f1 and the flow path cross-sectional area of the inlet and the outlet of the second section flow path f2 is possible to be made equal to each other. Thereby, it is possible to suppress ventilation resistance and to introduce air appropriately, while saving space. The sizes are an example, and may be modified as appropriate. It is not necessary to match the flow path cross-sectional area between the inlet and the outlet, and it is only necessary to suppress the extreme divergence of the flow path cross-sectional area.

First Modification Example

Figure 6:
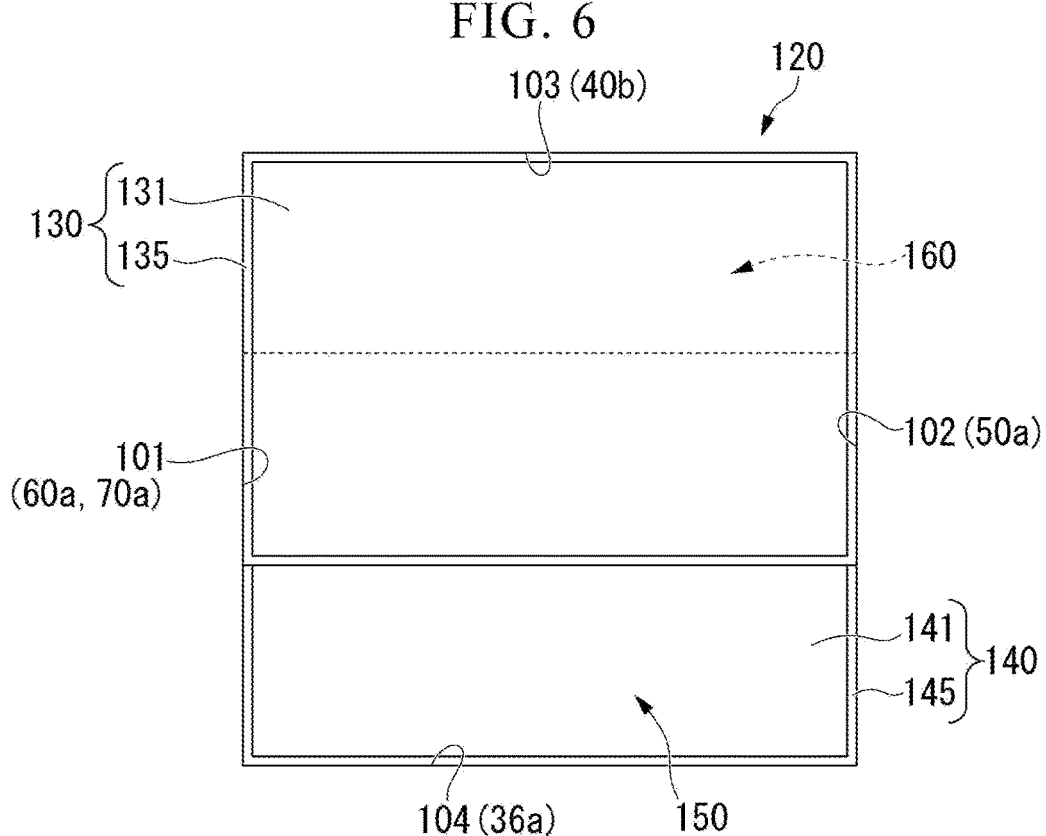
FIG. 6 is a view of a cooling device for a hydraulic excavator according to a first modification of the first embodiment of the present invention as seen from the upstream side in the flow path direction.

For example, as a first modification example of the first embodiment, the configuration shown in FIG. 6 may be used. In the first modification example, the upper wall surface 103 defining the main flow path F is defined as a first wall surface, and the lower wall surface 104 is defined as a second wall surface. As a result, the first cooling unit 130 extends downward from the first wall surface and defines a first opening portion 150 between the second wall surface and the first cooling unit 130. The second cooling unit 140 extends upward from the second wall surface on the downstream side of the first cooling unit 130, and defines a second opening portion 160 between the first wall surface and the second cooling unit 140. Each end portion in the width direction of the first cooling unit 130 and the second cooling unit 140 is in contact with the rear surface 60a of the partition plate 60 and the front surface 50a of the counterweight 50 over the vertical direction of the first cooling unit 130 and the second cooling unit 140. Although not shown in the drawing, the partition member is provided over the lower end of the first cooling unit 130 and the upper end of the second cooling unit 140. In this case, although the size in the vertical direction of the cooling device 120 becomes large, the size in the width direction of the cooling device 120 is possible to reduce. Therefore, the size of forward-rearward directions in the upper swing body 30 is possible to be suppressed.

Second Modification Example

Figure 7:
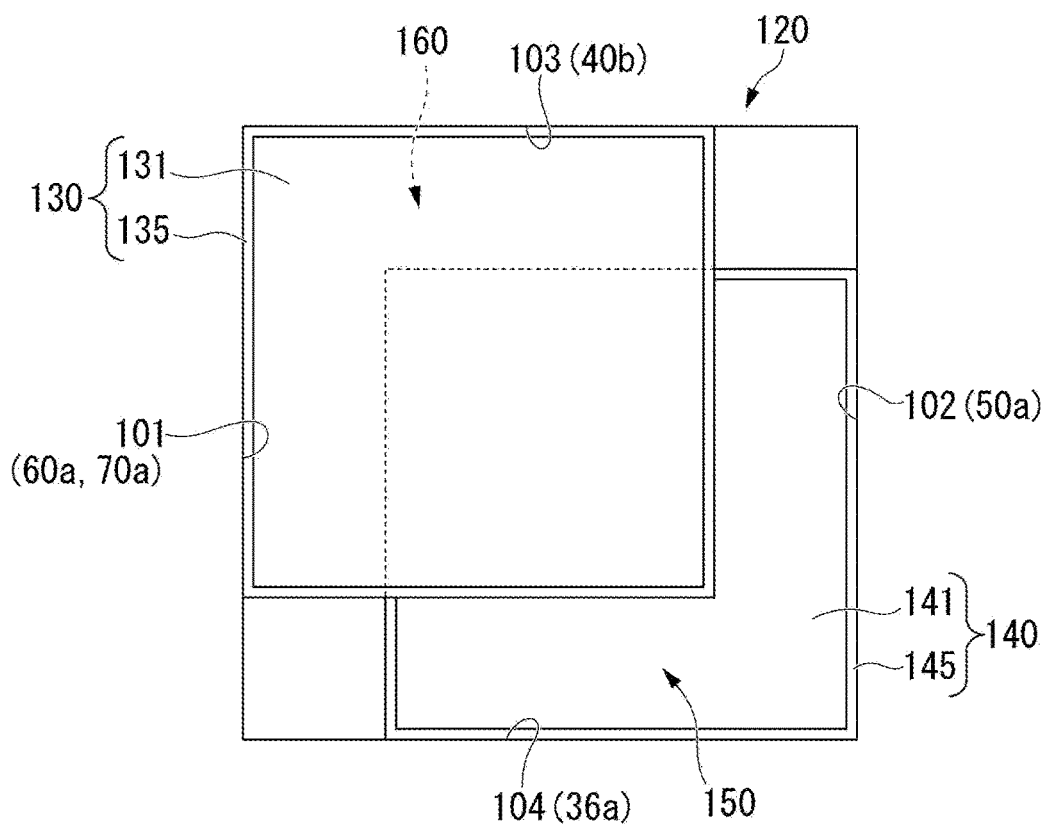
FIG. 7 is a view of a cooling device of a hydraulic excavator according to a second modification of the first embodiment of the present invention as seen from the upstream side in the flow path direction.

For example, as a second modification example of the first embodiment, the configuration shown in FIG. 7 may be used. In the second modification, the upper wall surface 103 defining the main flow path F and the rear surface 60*a* of the partition plate 60 are defined as the first wall surface, and the lower wall surface 104 and the front surface 50*a* of the counterweight 50 is defined as the second wall surface. As a result, the first cooling unit 130 extends obliquely downward from the first wall surface and defines a first opening portion 150 having an L-character shape between the front surface 50*a* of the counterweight 50 and the lower wall surface 104. The second cooling unit 140 extends obliquely upward from the second wall surface 102 on the downstream side of the first cooling unit 130, and defines a second opening portion 160 having an L-character shape between the rear surface 60*a* of the partition plate 60 and the upper wall surface 103. Although not shown, the partition member is provided between a portion configured by the lower end of the first cooling unit 130 and the end portion on the front surface 50*a* side of the counterweight 50 of the first cooling unit 130 and a portion configured by the upper end of the second cooling unit 140 and the end portion on the rear surface 60*a* side of the partition plate 60 of the second cooling unit 140. In this case, the size in the vertical direction and the forward-rearward directions of the cooling device 120 is possible to be suppressed.

Second Embodiment

Figure 8:
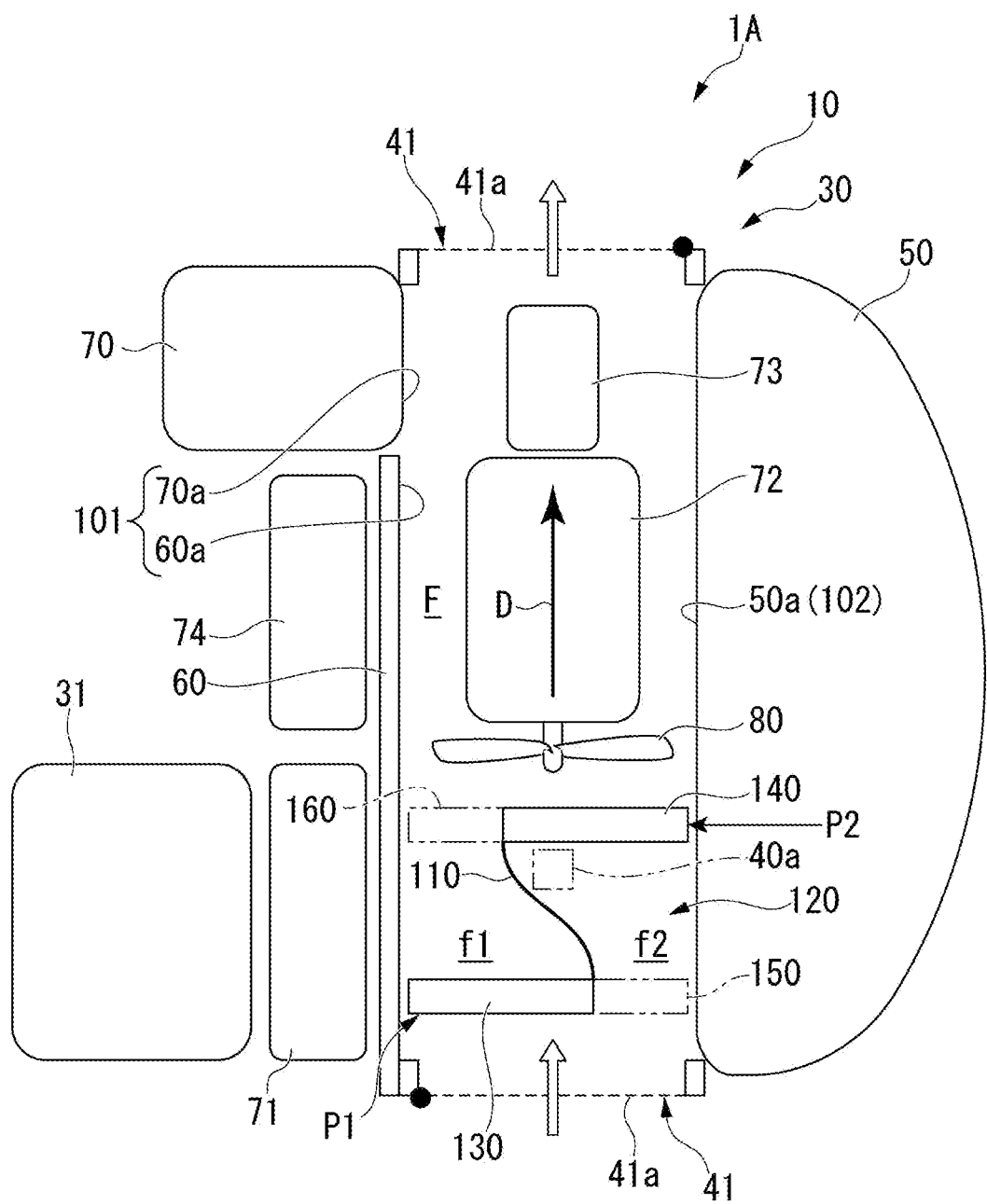
FIG. 8 is a schematic plan view showing the internal structure of the upper swing body in the hydraulic excavator according to the second embodiment of the present invention.

Next, a second embodiment will be described with reference to FIG. 8. In FIG. 8, the same elements as those in the first embodiment are denoted by the same reference numerals, and detailed description thereof will be omitted.

The hydraulic excavator 1A of the second embodiment has a communication port 40*a* for communicating the second section flow path f2 and an outside of the exterior cover 40 in the vertical direction in the exterior cover 40 (not shown in FIG. 8). The communication port 40*a* is formed independently from an opening of both ends in the flow path direction D of the main flow path F. That is, the communication port 40*a* is formed so as to penetrate vertically the upper wall surface 103 which defines the second section flow path f2 in the exterior cover 40. It is preferable that the formation portion of the communication port 40*a* is positioned closer to the second cooling unit 140 which serves as an outlet than the first opening portion 150 which serves as an inlet in the second partition flow path f2.

The communication port 40*a* is located on the partition member 110 side of the second section flow path f2. That is, the portion of the second section flow path f2 on the first wall surface 101 side is positioned at a position shifted from the first opening portion 150 toward the first wall surface 101. In order to introduce air into the portion, air needs to flow around, and there is a case where the air does not flow smoothly. Therefore, by forming the communication port 40*a* at a portion of the second section flow path f2 on the partition member 110 side, it is possible to introduce smoothly air into a portion where air is difficult to be introduced in the second cooling unit 140.

Thus, even when part of the opening area of the first opening portion 150 is carelessly blocked, air is possible to be sufficiently introduced into the second cooling unit 140 through the communication port 40*a*.

OTHER EMBODIMENT

Although the embodiment of the present invention has been described above, the present invention is not limited thereto and can be appropriately changed without departing from the technical idea of the present invention.

In embodiment, the main flow path F is extended in the left-right directions of the upper swing body 30, but may extend in, for example, forward-rearward directions, or may extend in the other direction. The flow path cross-sectional shape of the main flow path F is not limited to a quadrangle, and other shapes such as other polygonal shapes or a shape including a curved portion may be adopted. Accordingly, the first wall surface 101 and the second wall surface 102 may not have to be flat shape, but may have other shapes such as a curved surface. Further, the first cooling unit 130 and the second cooling unit 140 are not limited to the shape of the embodiments and may have other shapes.

The member defining the main flow path F is not limited to an example of the embodiment, and may be formed by other members.

In addition to the vent hole 41*a*, another vent hole may be provided in a portion on the upstream side of the first position P1 in the exterior cover 40 and the undercover 36 to penetrate these vertically and communicate the main flow path F to the outside. Thereby, the amount of air introduced into the main flow path F is possible to be increased.

The fan 80 may be configured to rotate independently of the engine 72 using a hydraulic motor or an electric motor as a drive source.

The size in the width direction of the first cooling unit 130 and the size in the width direction of the second cooling unit 140 may not be the same, and may be different from each other.

The cores 131 and 141 of the first cooling unit 130 and the second cooling unit 140 may be formed by arbitrarily combining heat exchangers such as radiator, oil cooler, and aftercooler. The radiator, the oil cooler and the aftercooler may have an arbitrarily size depending on the cooling capacity.

For example, the core 131 of the first cooling unit 130 may be constituted by only a radiator, and the core 141 of the second cooling unit 140 may be constituted by an oil cooler and an aftercooler arranged so as to be adjacent in the width direction.

The core 131 of the first cooling unit 130 may be constituted by an oil cooler and an aftercooler arranged adjacent to each other in the width direction, and the core 141 of the second cooling unit 140 may be constituted by only a radiator.

The core 131 of the first cooling unit 130 may be constituted by only an aftercooler, and the core 141 of the second cooling unit 140 may be constituted by an oil cooler and a radiator arranged adjacent to each other in the width direction.

The core 131 of the first cooling unit 130 may be constituted by an oil cooler and a radiator arranged adjacent to each other in the width direction, and the core 141 of the second cooling unit 140 may be constituted by only the aftercooler.

In the embodiment, an example has been described in which the left side of the upper swing body 30 is set as the upstream side of the main flow path F and the right side thereof is set as the downstream side. On the other hand, for example, the right side of the upper swing body 30 may be the upstream side of the main flow path F and the left side may be the downstream side thereof. Accordingly, the cooling device 120 may be disposed on the right side of the upper swing body 30 that becomes the upstream side of the main flow path F, and the fan 80, the engine 72, and the hydraulic pump 73 may be disposed on the left side of the upper swing body 30 that becomes the downstream side of the main flow path F. That is, the positional relationship between the cooling unit 120, the fan 80, the engine 72, and the hydraulic pump 73 may be reversed to the right and left sides of the embodiment.

In embodiment, an example in which the present invention is applied to the hydraulic excavator 1 or 1A has been described, but the present invention may be applied to another work machine such as a wheel loader, or the like.

INDUSTRIAL APPLICABILITY

According to the work machine relating to the present invention, cooling performance is possible to improve while reducing in size is achieved.

EXPLANATION OF REFERENCE SIGN

1: Hydraulic Excavator,
1A: Hydraulic Excavator,
10: Work Machine Main Body,
20: Undercarriage,
21: Crawler Track,
30: Upper Swing Body,
31: Cab,
32: Work Equipment,
33: Boom,
34: Arm,
35: Bucket,
36: Undercover,
36a: Upper Surface,
40: Exterior Cover,
40a: Communication Port,
40b: Top Surface,
41: Door Cover,
41a: Vent Hole,
50: Counter Weight,
50a: Front Surface,
60: Partition Plate,
60a: Rear Surface,
70: Oil Tank,
70a: Rear Surface,
71: Device Housing,
72: Engine,
73: Hydraulic Pump,
74: Hydraulic Valve,
80: Fan,
101: First Wall Surface,
102: Second Wall Surface,
103: Upper Wall Surface,
104: Lower Wall Surface,
110: Partition Member,
120: Cooling Device,
130: First Cooling Unit,
131: Core,
132: Heat Radiation Tube,
133: Fin,
134: Communication Hole,
135: Outer Frame,
140: Second Cooling Unit,
141: Core,
142: Heat Radiation Tube,
143: Fin,
144: Communication Hole,
145: Outer Frame,
150: First Opening Portion,
160: Second Opening Portion,
F: Main Flow Path,
F1: First Section Flow Path,
F2: Second Section Flow Path,
D: Flow Path Direction,
P1: First Position,
P2: Second Position

The invention claimed is:

1. A work machine comprising:
a work machine main body having a first wall surface and an opposing second wall surface defining a space therebetween which is a main flow path for air;
a fan for allowing air to flow along a flow path direction which is a direction in which the main flow path extends;
a first cooling unit that protrudes from the first wall surface so as to be perpendicular to the flow path direction and defines a first opening portion between the first cooling unit and the second wall surface, at a first position in the flow path direction of the main flow path;
a second cooling unit that protrudes from the second wall surface so as to be perpendicular to the flow path direction and defines a second opening portion between the first wall surface and the second cooling unit along with partially overlapping the first cooling unit when viewed from the flow path direction, at a second position downstream of the first position in the flow path direction of the main flow path; and
a partition member that is provided across an end portion of the first cooling unit on the second wall surface side and an end portion of the second cooling unit on the first wall surface side and defines a first section flow path having the first cooling unit as an inlet and the second opening portion as an outlet, and a second section flow path having the first opening portion as an inlet and the second cooling unit as an outlet.

2. The work machine according to claim 1,
wherein the first cooling unit has a communication hole through which air flows in a direction coinciding with a thickness direction of the first cooling unit; and
the second cooling unit has a communication hole through which air flows in a direction coinciding with a thickness direction of the second cooling unit.

3. The work machine according to claim 2,
wherein a flow path cross-sectional area of the first section flow path decreases from the inlet toward the outlet, and
the flow passage cross-sectional area of the second section flow path increases from the inlet toward the outlet.

4. The work machine according to claim 3,
wherein the work machine main body includes a communication port that communicates the second section flow path with an outside.

5. The work machine according to claim 4,
wherein the main flow path extends in right-left directions of the work machine main body, and the first wall surface and the second wall surface face each other in forward-rearward directions of the work machine main body.

6. The work machine according to claim 3,
wherein the main flow path extends in right-left directions of the work machine main body, and the first wall surface and the second wall surface face each other in forward-rearward directions of the work machine main body.

7. The work machine according to claim 2,
wherein the work machine main body includes a communication port that communicates the second section flow path with an outside.

8. The work machine according to claim 7,
wherein the main flow path extends in right-left directions of the work machine main body, and the first wall surface and the second wall surface face each other in forward-rearward directions of the work machine main body.

9. The work machine according to claim 2,
wherein the main flow path extends in right-left directions of the work machine main body, and the first wall surface and the second wall surface face each other in forward-rearward directions of the work machine main body.

10. The work machine according to claim 1,
wherein a flow path cross-sectional area of the first section flow path decreases from the inlet toward the outlet, and
the flow passage cross-sectional area of the second section flow path increases from the inlet toward the outlet.

11. The work machine according to claim 10,
wherein the work machine main body includes a communication port that communicates the second section flow path with an outside.

12. The work machine according to claim 11,
wherein the main flow path extends in right-left directions of the work machine main body, and the first wall surface and the second wall surface face each other in forward-rearward directions of the work machine main body.

13. The work machine according to claim 10,
wherein the main flow path extends in right-left directions of the work machine main body, and the first wall surface and the second wall surface face each other in forward-rearward directions of the work machine main body.

14. The work machine according to claim 1,
wherein the work machine main body includes a communication port that communicates the second section flow path with an outside.

15. The work machine according to claim 14,
wherein the main flow path extends in right-left directions of the work machine main body, and the first wall surface and the second wall surface face each other in forward-rearward directions of the work machine main body.

16. The work machine according to claim 1,
wherein the main flow path extends in right-left directions of the work machine main body, and the first wall surface and the second wall surface face each other in forward-rearward directions of the work machine main body.

* * * * *